United States Patent [19]

Bentley et al.

[11] Patent Number: 5,727,047
[45] Date of Patent: Mar. 10, 1998

[54] ARRANGEMENT FOR INTERFACING A TELEPHONE DEVICE WITH A PERSONAL COMPUTER

[75] Inventors: Jon Louis Bentley, New Providence; Greg E. Blonder, Summit, both of N.J.; Paul W. Hutchison, Oakland, Calif.; Kevin M. Ow-Wing, Castro Valley, Calif.; Michael S. Raven; Joseph E. Schlessinger, both of Berkeley, Calif.; Dennis W. Specht, Basking Ridge; Eric E. Sumner, Jr., Bernardsville, both of N.J.; Ralph J. Weaver, III, Carmal, Ind.

[73] Assignee: Lucent Technologies Inc., Murray Hill, N.J.

[21] Appl. No.: 368,678

[22] Filed: Apr. 26, 1995

[51] Int. Cl.$^6$ .......................... H04M 11/00; H04M 1/64
[52] U.S. Cl. .................. 379/93; 379/90; 379/98; 379/100; 379/67
[58] Field of Search .......................... 379/100, 110, 379/98, 97, 96, 142, 376, 386, 396, 67, 68, 204; 364/919

[56] References Cited

U.S. PATENT DOCUMENTS

| | | | |
|---|---|---|---|
| 4,653,090 | 3/1987 | Hayden | 379/204 |
| 4,701,946 | 10/1987 | Oliva et al. | 379/93 |
| 4,776,005 | 10/1988 | Petriccione et al. | 379/142 |
| 4,860,339 | 8/1989 | D'Agosto, III et al. | 379/110 |
| 4,922,450 | 5/1990 | Rose et al. | 364/900 |
| 5,008,927 | 4/1991 | Weiss et al. | 379/110 |
| 5,317,630 | 5/1994 | Fienberg et al. | 379/142 |
| 5,333,152 | 7/1994 | Wilber | 379/98 |
| 5,343,516 | 8/1994 | Lallele et al. | 379/142 |
| 5,373,551 | 12/1994 | Baals et al. | 379/110 |
| 5,550,649 | 8/1996 | Wong et al. | 379/100 |

OTHER PUBLICATIONS

Brochure for Cermetek Microelectronics, "a New Generation of Information Terminals", Apr. 1987.

*Primary Examiner*—Curtis Kuntz
*Assistant Examiner*—Stephen W. Palan
*Attorney, Agent, or Firm*—Samuel R. Williamson

[57] ABSTRACT

An arrangement provides an interface between a telephone device and a personal computer in such a manner that enhanced capability for both the telephone device and the computer in processing information in an analog telephone environment is provided. The telephone device attaches to an analog telephone line and advantageously operates either as a stand-alone device when the computer is powered-off or in tandem with the computer when the computer is powered-on. A user is able to access any of the available telephony features from the telephone device at all times and from the computer when it is powered-on. Such available telephony features include, by way of example, Caller ID for decoding available information presented on the analog telephone line and an integrated telephone answering system, which provides for reception, transmission, and storage of voice, facsimile, and electronic mail messages.

25 Claims, 7 Drawing Sheets

ARRANGEMENT FOR INTERFACING A TELEPHONE DEVICE WITH A PERSONAL COMPUTER

BACKGROUND OF THE INVENTION

1. Technical Field

This invention relates to computer telephony integration and, more particularly, to telephone devices having storage capabilities that are enhanced through the use of personal computers.

2. Description of the Prior Art

Telephone devices and computers are both in wide use today in most small businesses and homes. Both telephone devices and computers have specific or unique features and in different ways are very beneficial to a user. For example, a telephone device has many features that aid a user in making and receiving telephone calls including storing messages or forwarding calls, as appropriate. And a computer is quite useful in storing, processing and retrieving data. Full integration of telephone devices and computers for use in an analog telephone environment, such as typically found in a small business or home, has not yet been achieved, however.

Many arrangements are available today for connecting a telephone device to a computer. One such arrangement is described in U.S. Pat. No. 5,317,630. In this arrangement, a data terminal interface connects the computer to the telephone device and also to a digital network. Although flexibility and control of information in a communication environment are provided for a user, such arrangement is designed for use in a digital communication system and the computer used in processing the digital protocol employed therein must have adequate available data processing capability. Also, both the computer and the telephone device are always fully activated in order to quickly process information or to respond to information that may be specifically directed to just one of these units.

Some personal computers are integrated with telephony functionality which is accessible while the computer is turned off. Such operation in this type of arrangement is obtainable through the architecture inherent in the computer. This architecture permits the computer to manage its power consumption based on telephony events and messages. Even though power is conserved in such an arrangement, accessing simple telephony functions such as is required in making a telephone call also requires execution of an application software package. Thus, a disadvantage associated with this type of arrangement is that using simple telephone functions also requires turning on the computer.

Computers also may provide computer-telephony functionality by combining packaged application software and a telephone modem. Such software allows users to enter phone numbers and phone lists, and also permits users to manage telephony functions, such as hang-up, hold, mute and the like. Moreover, this software enables users to dial quickly. Unfortunately, in this type of arrangement, the application software cannot directly control the telephone device. Rather, commands provided in the application software are executed on the modem which provides the common connection between the computer and the telephone device. Thus a user at the computer is not able to directly access the telephone device nor can a user at the telephone device directly access the computer. By way of example, any dialing from the computer must be executed on the modem and the telephone device is connected during this dialing operation only as a listening device.

SUMMARY OF THE INVENTION

In accordance with the present invention, an arrangement provides an interface between a telephone device and a personal computer in a manner that provides total flexibility and control of information in an analog telephone environment. The computer need not be dedicated, but may run other software applications while providing the desired computer-telephony functionality.

In accordance with a first aspect of the invention, the telephone device attaches to an analog telephone line and advantageously operates either as a stand-alone device when the computer is powered-off or in tandem with the computer when the computer is powered-on. When the computer is powered-on and the level of information stored in the telephone device exceeds a predetermined level, information from the telephone device is transferred to the computer. Thus, enhanced telephone-computer capability is achieved while permitting periodic conservation of power in the computer without reducing telephone functionality.

In accordance with a second aspect of the invention, a user is able to access any of available telephony features from the telephone device at all times and from the computer when it is powered-on. Such available telephony features include, by way of example, reception of Caller ID information, call screening, and an integrated telephone answering system, which provides for reception, transmission, and storage of voice, facsimile, and electronic mail messages.

In accordance with the disclosed invention, an arrangement for interfacing a telephone device with a personal computer comprises: means for attaching the telephone device to an analog line and to the personal computer, sensing means for determining when the computer is in a powered-on state and in a powered-off state, and means responsive to the sensing means for transferring information between the telephone device and the computer while the computer is in the powered-on state.

BRIEF DESCRIPTION OF THE DRAWING

This invention and its mode of operation will be more clearly understood from the following detailed description when read with the appended drawing in which.

Throughout the drawing, the same element when shown in more than one FIG. is designated by the same reference numeral.

DETAILED DESCRIPTION

Figure 1:
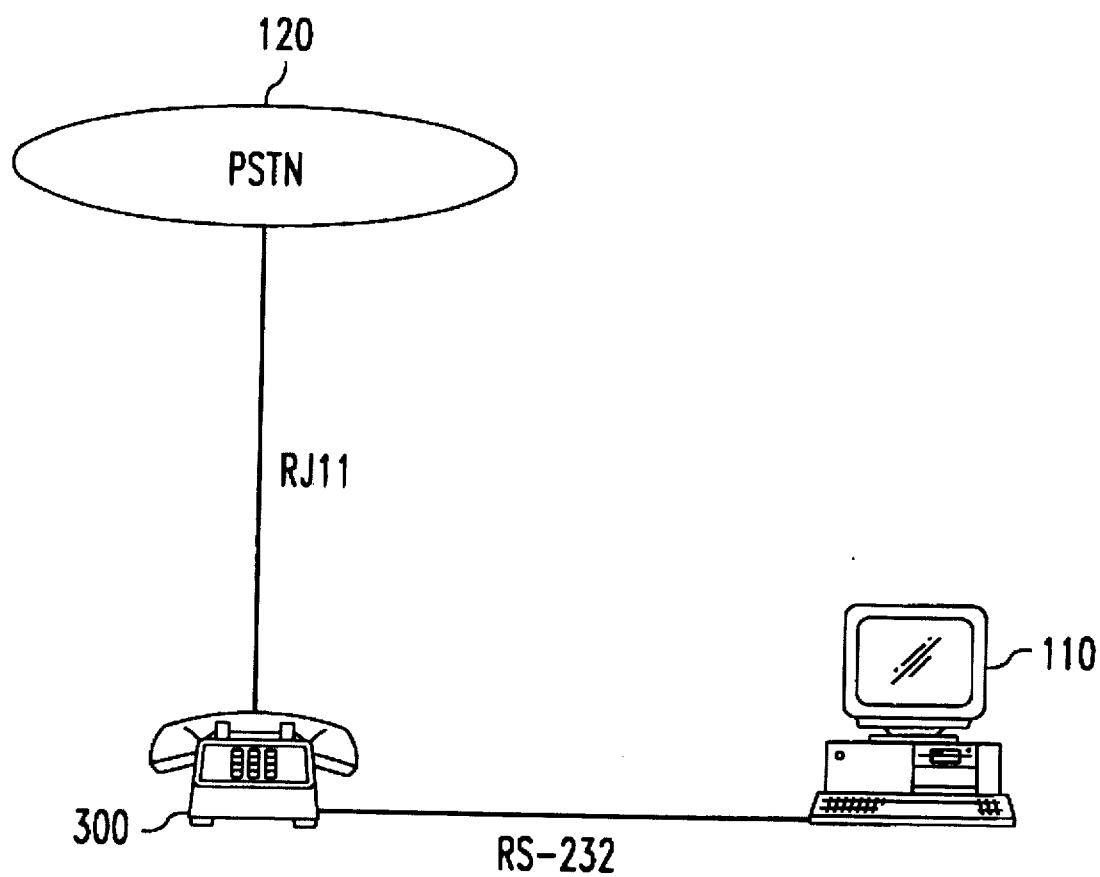
FIG. 1 shows a telephone station connected to a personal computer and via an analog telephone to a public telephone switched network.

Referring now to FIG. 1 of the drawing, there is shown a telephone device 300 which incorporates an arrangement for interfacing such telephone device with a personal computer 110. The telephone device 300 connects to the personal computer 110 over a cable through an RS-232 interface. The telephone device is also connected to the public switched telephone network over at least one analog telephone line which terminates in an RJ11 jack. Also optionally included in the housing that contains the telephone device 300 is a 1330 digital answering system. Such an answering system is presently available from AT&T.

Figure 2:
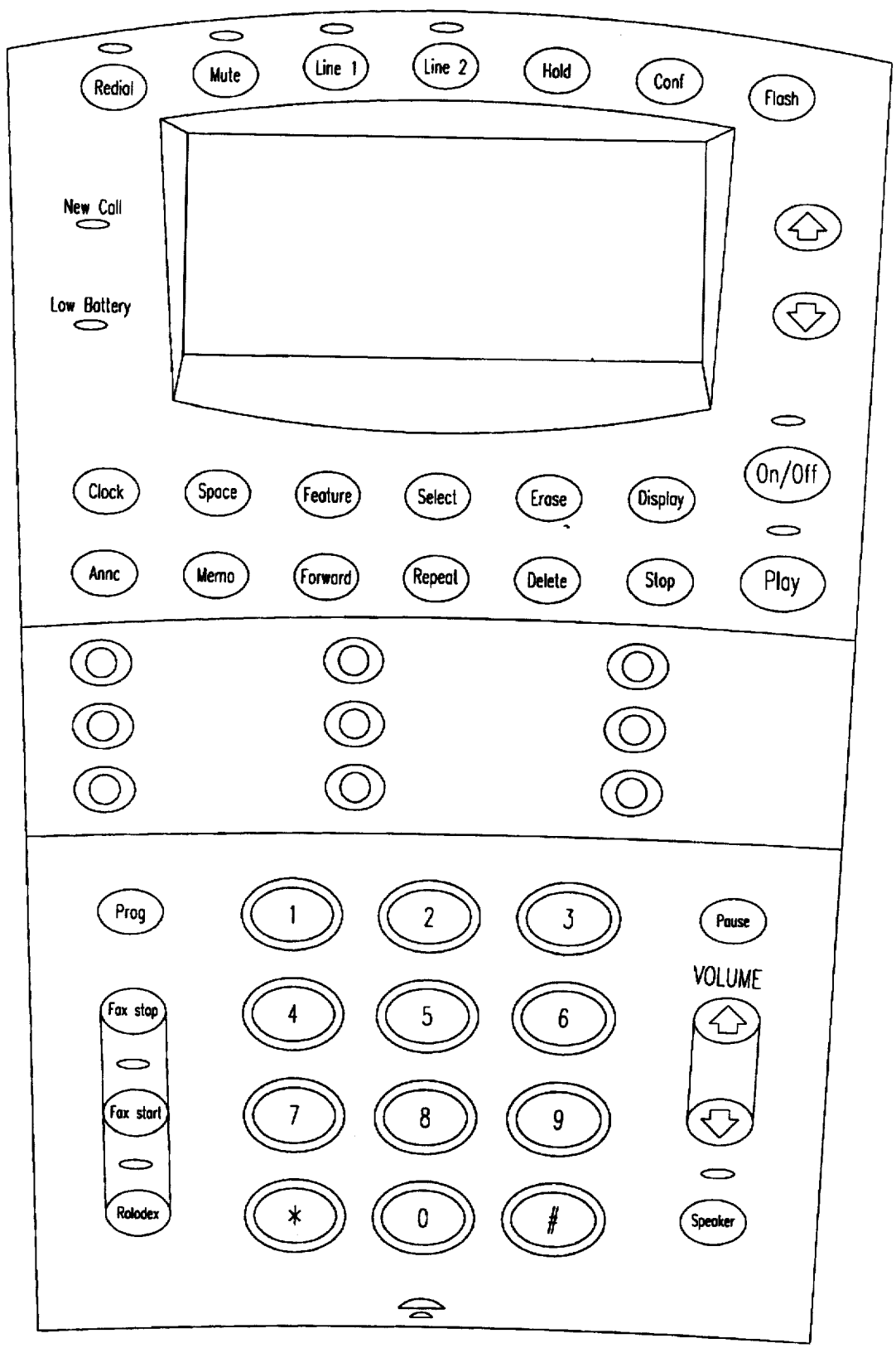
FIG. 2 shows a drawing of the top surface of the housing for the telephone device shown in FIG. 1 for illustrating various features and functions that are available at this device.

FIG. 2 shows a drawing of the top surface of the housing for the telephone device 300 shown in FIG. 1 for illustrating various features and functions that are available at this device.

Figure 3:
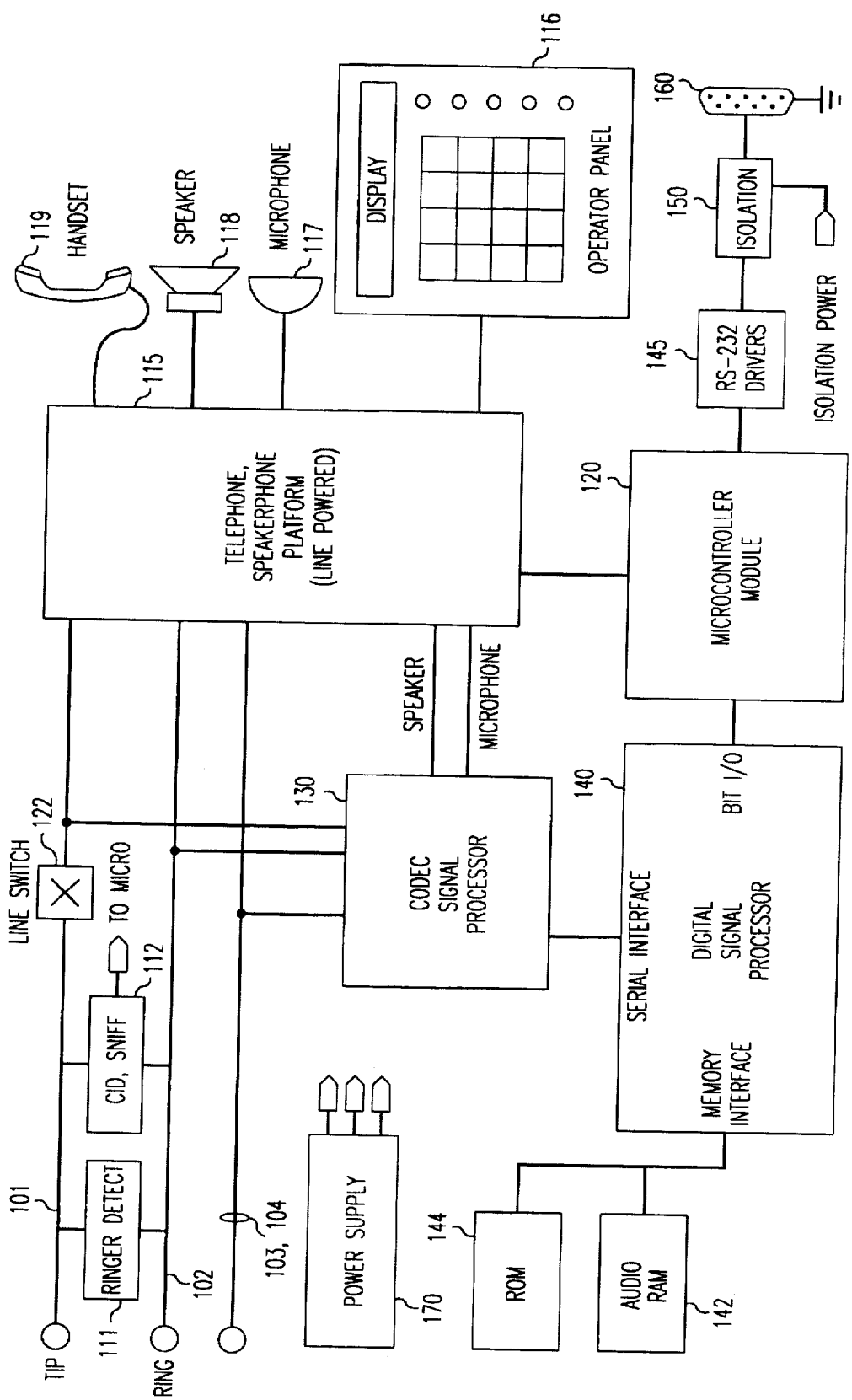
FIG. 3, shows a high-level block diagram of a two line telephone device which incorporates the arrangement for interfacing such telephone device with the personal computer.
Figure 4:
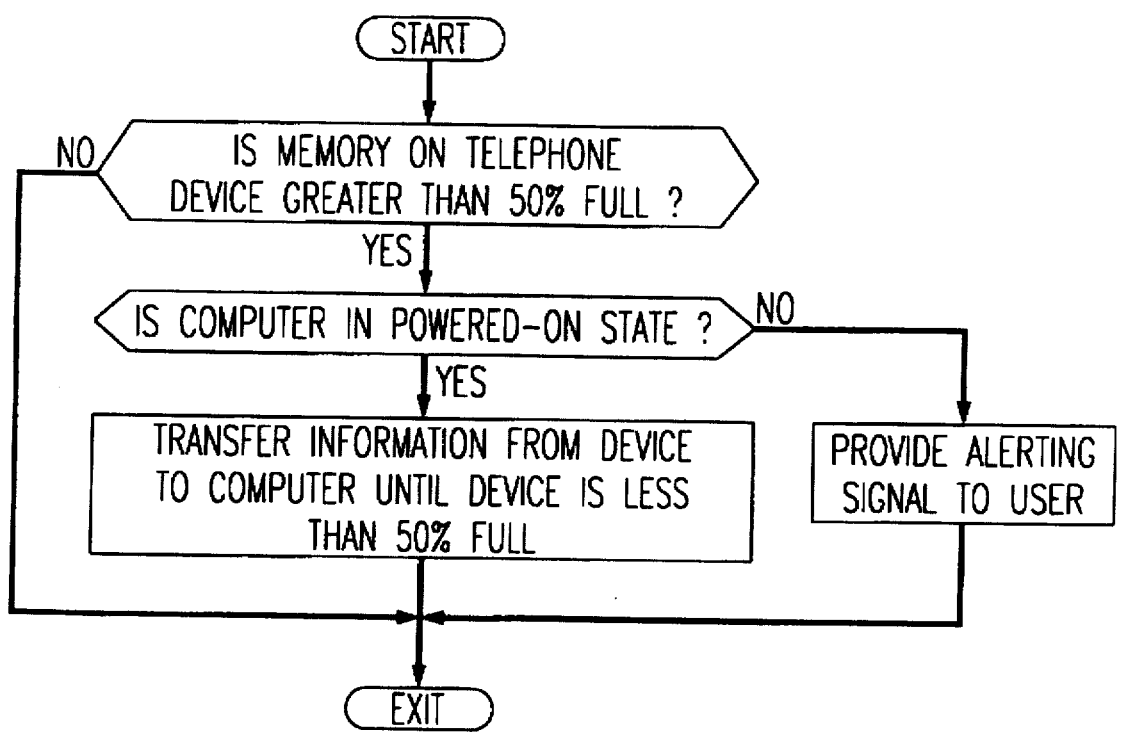
FIGS. 4 through 7 show flow charts of some of the functions performed by the circuitry and controls shown in FIGS. 1 through 3, in accordance with the invention.
Figure 5:
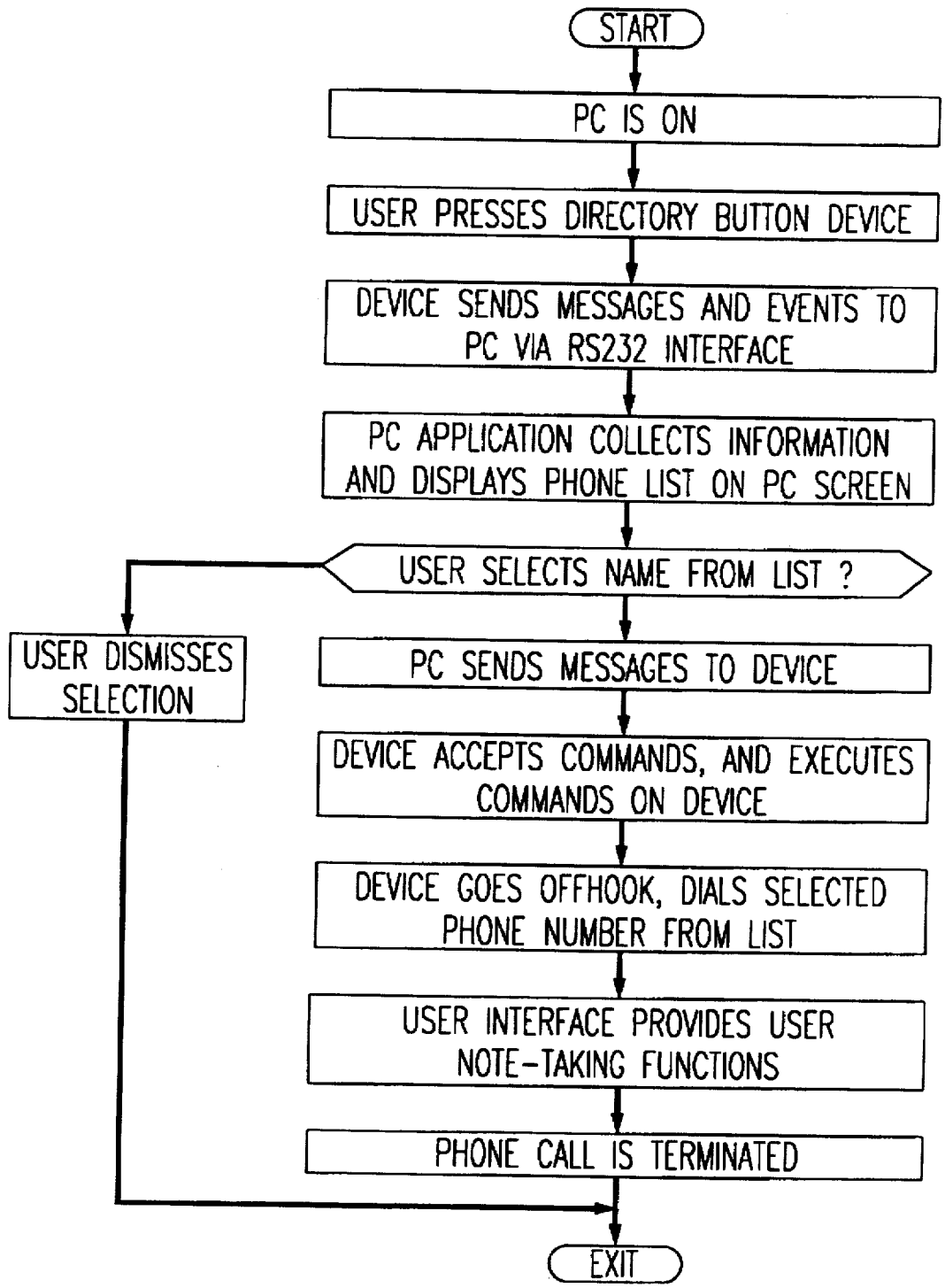
Figure 6:
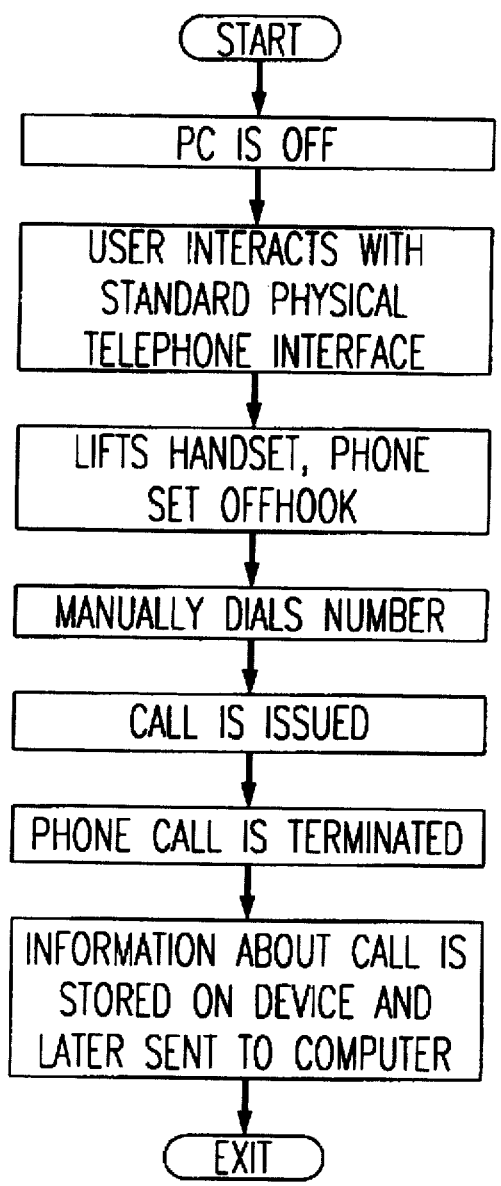
Figure 7:
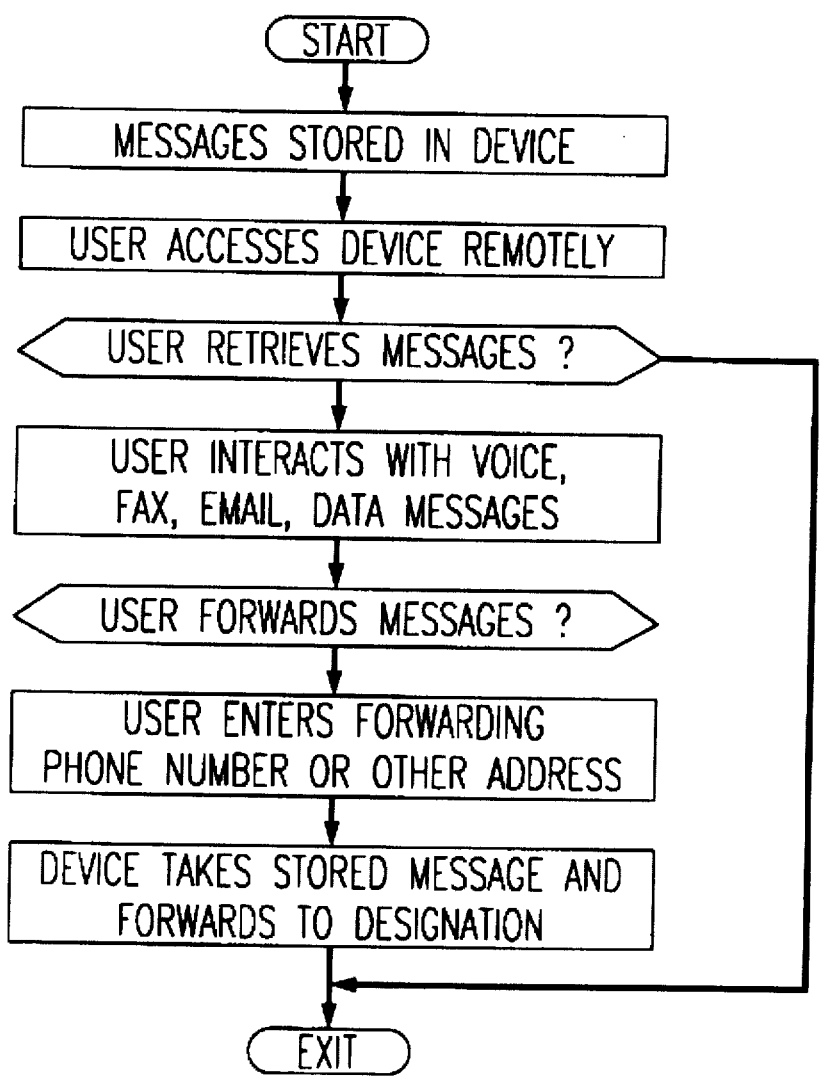

Referring next to FIG. 3, there is shown a high-level block diagram of a two line telephone device with a computer interface, in accordance with the disclosed invention. This combination or system interfaces with a central office over tip-ring line pairs 101, 102 and 103, 104. Although functionally equivalent with the same circuitry, tip-ring line pair 103, 104 and its circuitry are not shown in the same detail as tip-ring line pair 102, 103. Thus the explanation herein will make reference to the tip-ring line pair 102, 103. Connected to tip-ring line pair 101 and 102 are a ringer detect circuit 111 and a Caller-ID decoder and sniff circuit 112. This circuit not only provides information as to the identity of an incoming call provided through the caller-ID function, but also provides information as to the on or off hook status of other telephone sets also connected to the tip-ring lines 101 and 102. The caller-ID portion of circuit 112 is also employed as a demodulator for demodulating incoming data signals up to and including 1200 bits/second. This sniff circuitry portion of circuit 112 detects the busy status of a called telephone number by determining the cadence of the busy tone provided over the tip-ring lines 101 and 102. Other functions such as facsimile, data handshake signals, ring-back, bong, call progress tones and other signal appearances on the line are used. The telephone finger detect circuit 111 passes its information to the telephone speakerphone platform and that, in turn, informs the microcontroller module 120. The microcontroller module 120 generates a distinctive ringing signal back to the telephone speakerphone platform in view of input received from the Caller-ID circuit 112 which then actuates the speaker.

A conventional line switch 122 responsive to the microcontroller 120 is actuated for either completing an outgoing call or responding to an incoming ringing signal. A codec signal processor 130 performs analog to digital conversion and digital to analog conversion for answering machine and facsimile transmission and reception. The codec signal processor 130 is also used for outgoing answering machine announcements. The DSP 140 provides a number of functions. By way of example, it provides 1) the keyscan for the keypad, 2) audio routing control for the handset and speakerphone, 3) provides a serial link to the microcontroller module 120, 4) DTMF generation, 5) conference control, and 6) energy detect for autoredial busy cadence detect.

Under the control of the DSP 140, the audio RAM 142 stores messages of facsimile, voice and e-mail. Contained in ROM 144 is the program code and the fault greetings that are employed in the system. These default greetings include prerecorded greetings, for example. Connected to the telephone speakerphone platform 115 are an operator panel and LCD display 116, a microphone 117, a speaker 118 and a handset 119. The operator panel and LCD display provides caller-ID information, set up in configuration information, date and time, redial lists. The RS-232 drivers 145 translates RS232 voltage levels provided at a connector 160 to voltages suitable for use as internal voltages inside the system 300. The isolation block 150 protects against hazardous voltages entering the system. A power supply 170 provides power to all of the components in system 300. Commercially available components suitable for use in system 300 are presently available. For example, a CSP1004 is suitable for use as processor 130, a DSP 1604-M24 is suitable for use as digital signal processor 140, and microprocessor 80C32 is suitable for use as microcontroller 120. Telephone speakerphones are also known and are available, for Example, Speakerphone S201A is presently available from AT&T and the technique disclosed therein is described in U.S. Pat. No. 5,187,741. Circuitry for generating a caller ID feature is described in U.S. Pat. No. 4,277,649.

Many applications are available and obtained from the arrangement or system shown in FIGS. 1 through 4. To provide greater emphases for those applications and to describe how enhanced capability for both the telephone device and the computer in processing information in an analog telephone environment is achieved, the following detailed description of some of the many available applications and system operation is provided.

The system includes a telephone device that is used to make and receive calls on two analog telephone lines. It also decodes Caller ID information received over both telephone lines. Information can be uploaded to and downloaded from a readily available IBM-compatible personal computer with a processor such as an Intel 80286 or higher. The system operates in the Microsoft Windows environments, versions 3.1 or 3.11, for example.

The system may be connected to two telephone lines in a single wall jack, to two telephone lines in separate wall jacks, or to a single telephone line, if a user wishes to do so. The system is connected to the personal computer through its RS-232 interface connection. In order to connect the system to the personal computer, the user inserts one end of a 9-pin cord into the COMPUTER jack on the back of the system and the other end of the 9-pin cord into a serial port on the personal computer.

When the system is first connected to AC power as well as when an initial check indicates that memory has been lost (due to absence of AC and battery power), the system begins an initialization routine to check answering system memory. During the first 3 to 4 seconds of initialization, all of the lights on the telephone device flash on and off and all of the segments in the display are presented. The display then changes to an "initialization" screen, the ON/OFF light continues to flash on and off, and all other lights should be off. The timer in this screen begins at an initial value of: 18 and counts down at a rate of approximately 1/second until it reaches :00. When the timer reaches :00, the initialization routine is complete, the ON/OFF light should be on steady and the system enters standby mode within 1 second.

After the initialization routine is completed, the system displays a "standby mode" screen which reflects that a power failure has occurred with no battery back-up. While the system is in standby mode, all answering system and telephone features should be operational.

An On/off status light indicates when the system is set to answer calls.

If the on/off status light is off, then the system is off and calls will be answered according to the 10-ring answer routine described later herein. A "system off" screen is displayed and no answering system features except for setting the clock are active.

If the on/off status light is on steady, then the system is on and calls will be answered according to the ring select setting.

If the on/off status light is flashing rapidly, the system is on, but calls will not be answered according to the 10-ring answer routine because (a) memory is full or (b) the AO announcement is selected and no announcement is recorded. To change on/off status from off to on or from on to off, the user presses the ON/OFF button.

The system can record four different announcements (A, B, AO, and a memory match announcement) that is selected to be played to callers when the system answers a call. Each of the recorded announcements can be up to 4 minutes long. There is also a prerecorded "default" announcement for Announcements A and B as described later herein.

To select an announcement to be recorded or reviewed the user presses the ANNC button while the system is in standby mode. The system enters announcement select mode, displays the selected announcement screen which shows (A, B, AO, or CALL MATCH). When the system enters announcement select mode from standby mode, the selected announcement is the announcement currently selected. While the selected announcement screen is displayed, the user may select a different announcement by pressing the SELECT button, which selects the next announcement in the sequence A, B, AO, CALL MATCH (jumping from CALL MATCH back to A). The system remains in announcement select mode until RECORD is pressed, PLAY is pressed, STOP is pressed, the system goes off-hook or 60 seconds elapse with no input that changes the screen. If RECORD is pressed, the system begins to record the selected announcement as described later herein. If PLAY is pressed, the system begins to play the selected announcement as described later herein. If STOP is pressed or the system goes off-hook or 60 seconds elapse with no input that changes the screen, the system enters the standby mode.

To record an announcement, the user presses the RECORD button while the system is in announcement select mode. When the RECORD button is pressed, the system presents a beep and begins recording the selected announcement from the base microphone. The system continues to record until the STOP button is pressed, the maximum announcement length elapses, a four second silent period is detected, or memory becomes full.

- If the STOP button is pressed after a valid announcement has been recorded (as determined by a minimum time of VOX energy), the system stops recording and begins to play the recorded announcement through the speaker.
- If the STOP button is pressed before a valid announcement is recorded, the system stops recording and presents 5 rapid beeps.— If the selected announcement is A or B, the system begins to present the default announcement through the speaker.— If the selected announcement is AO the system presents a single beep, then returns to the announcement select mode with the selected announcement screen displayed.
- If the maximum announcement length elapses or a 4-second silent period is detected, the system presents a single beep through the speaker and begins to play the announcement through the speaker.
- If memory becomes full, the system stops recording, presents five rapid beeps and begins to play the announcement through the speaker. When the system begins to play an announcement, it continues to play the announcement as if the PLAY button had been pressed as described in the section immediately herein below.

To review an announcement, the user presses the PLAY button while the system is in announcement select mode.

When the PLAY button is pressed, the system begins playing the selected announcement through the speaker. If an announcement is recorded for the selected announcement, that announcement is presented. If no announcement is recorded for the selected announcement and the selected announcement is A or B, the default announcement is presented. If no announcement is recorded for the selected announcement and the selected announcement is AO, the system presents a single beep then returns to the announcement select mode with the selected announcement screen displayed. When the system begins to play an announcement, then:

- If the call screening volume is less than 2, the announcement playback volume is set to 2.
- If the call screening volume is 2 or above, the announcement playback volume is set to the call screening volume. The system continues to play the announcement until the end of the announcement is detected or the STOP button is pressed. When either of these events occurs, the system stops playing the announcement and returns to announcement select mode. While the system is playing an announcement, the user can press the VOLUME UP or VOLUME DOWN button to change the announcement playback volume. The volume changes, but the display does not change.

To delete an announcement, the user can: Follow the steps for reviewing that announcement, then press DELETE while the system is playing the announcement. Hold down the DELETE button for 1.5 seconds while the selected announcement screen is displayed with that announcement indicated as the selected announcement. In either case, the system announces "deleted," then this screen is displayed and the system is configured in the announcement select mode.

The system provides one prerecorded announcement. This announcement ("Hello. Please leave a message after the tone") is presented when no announcement is recorded for the A or B announcement. The default announcement can be reviewed locally or remotely. There is no default announcement for the AO announcement or the memory match announcement.

For a memory match announcement, the user can enter the telephone number to be matched (or choose to match blocked calls), select the number of rings before the system answers for a memory match announcement call, select the number of memory match announcement calls for which the system will play the announcement, and select whether or not the system will present the memory match announcement then hang up without recording a message.

While the system is in announcement select mode with the memory match announcement selected and the memory match announcement screen displayed, the user may press the numeric dial buttons (0-9) to enter a memory match telephone number, press # to select "blocked calls" as the to-be-matched calling information, or press REMOVE to clear the memory match telephone number.

- If no numeric dial buttons have been pressed since the system most recently displayed the announcement select screen with the memory match announcement selected, and the user presses a numeric dial button, then the system clears the number field and displays the digit corresponding to the button in the rightmost position in the number field.
- If at least one numeric dial button has been pressed since the system most recently displayed the announcement select screen with the memory match announcement selected, and the user presses a numeric dial button, the system clears any digit in the leftmost (first) position in the number field, moves each of the digit in the second through tenth positions of the number field 1 position to the left, and displays the number corresponding to the dial button in the rightmost (tenth) position in the number field. If the user presses [#], then the system clears the number field and "ANNC:PRIVATE" is displayed in the name field. If the user presses REMOVE, the system displays 12 dashes in the number field and "ANNC:CALL MATCH" is displayed in the name field. If the user performs any action to exit the announcement select mode or to select a different announcement, the system stores the number in the number field as the memory match telephone number unless "MATCH:PRIVATE" is displayed in the name field, in which case the system stores "private calls" as the memory match criterion.

If the system is in announcement select mode with the memory match announcement selected, the system displays the memory match announcement ring select screen with the current ring select setting for memory match announcement calls. The default setting (i.e., the setting if the user has not changed the ring select setting for memory match announcement calls since the system last initialized memory) is whatever the current ring select setting is for the system. To change the setting, the user presses a dial button 1–9 or presses SELECT.

If the user presses a dial button 1–9, the ring select setting corresponding to that button is displayed as the ring select setting. For 1–7, the ring select setting is the same as the number on the button; for 8, the ring select setting is 4-2 Toll Saver; and for 9, the ring select setting is 6-4 Toll Saver.

If the user presses SELECT, the system displays the next setting in the list 1, 2, 3, 4, 5, 6, 7, 4-2 Toll Saver, 6-4 Toll Saver, with the list wrapping around from the last item to the first item. The system continues to display the memory match announcement ring select screen until the user presses FEATURE or the system exits announcement select mode.

If the user presses FEATURE while the memory match announcement ring select screen is displayed, the system displays the memory match announcement number of calls screen with the current setting for the number of calls. The default setting is "ALL CALLS." To change the setting, the user presses a dial button 1, 2, 3, or #, or presses SELECT.

If the user presses a dial button 1, 2, 3 or #, the number of calls setting corresponding to that button is displayed as the number of calls setting. For 1, 2, or 3, the number of calls setting is the same as the number on the button. For #, the number of calls setting is "ALL CALLS."

If the user presses SELECT, the system displays the next setting in the list ALL CALLS, 1, 2, 3, with the list wrapping around from the last item to the first item. The system continues to display the memory match announcement number of calls screen until the user presses FEATURE or the system exits announcement select mode.

If the user presses FEATURE while the memory match announcement number of calls screen is displayed, the system displays the memory match announcement announce only screen with the current setting for announce only. The default setting is OFF. To change the setting, the user presses 0 or 1, or presses SELECT.

If the user presses 0 or 1, the announce only setting corresponding to that button is displayed as the announce only setting. For 0, the announce only setting is OFF. For 1, the announce only setting is ON.

If the user presses SELECT, the system toggles from OFF to ON or from ON to OFF. The system continues to display the memory match announcement announce only screen until the user presses FEATURE or the system exits announcement select mode. If the user presses FEATURE, the announcement select screen is displayed with memory match announcement selected.

If the device is out-of-box, the clock setting of "12:00 AM" flashes on and off in the standby screen whenever the time is displayed in the screen and the current day setting is presented through the speaker. The time, day and year all may be set while setting the clock.

The system provides a programming sequence to set the telephone for dial-pulse (PULSE) or touch-tone (TONE) dialing. The default setting is for PULSE dialing to ensure out-of-box operation.

To view the dial mode selection option, the user presses PROGRAM to cause the system to enter the program mode, then presses [DISPLAY DIAL] in the repertory area. The "dial mode" screen is displayed. Tap # to change Dial mode=PULSE. When the "dial pulse" screen is displayed, the user can press # to change the preferred line. If ok, tap PROGDial mode=TONE. When the system is in program mode, it remains in program mode until one of the following events happen: The user presses PROGRAM. In this case, the system presents a single beep and returns to standby mode and the "standby mode" screen is displayed. Sixty seconds elapse with no valid input. In this case, the system returns to standby mode and the "standby mode" screen is displayed. If the system is on-hook and the user releases the switchhook or presses SPEAKER to go off-hook, the system exits the program mode and the "off-hook" screen is displayed. If AC power is lost the system exits the program mode.

For memory dialing of telephone numbers, the system can store sequences of digits/characters (maximum of 24 digits/characters in a sequence) in 11 memory locations. The digits/characters that can be stored include: 0–9, *, #, F (for FLASH), - (a hyphen for spacing), P (for pause) and W (for wait). The locations provide one-touch dialing by pressing one of the memory dial buttons when the telephone device is off-hook.

To store a sequence in a memory dialing location, the system must be in program mode. To place the system in program mode, the user presses the PROGRAM button while the system is in standby mode (either on-hook or off-hook). When the system enters program mode, the system presents a single beep if the speakerphone is off and the "program mode" screen is displayed with a flashing cursor (underline) in the leftmost position of the 2nd line of the display. While the system is in program mode, none of the answering system features are operational, except that ON/OFF can be used to turn the system on and off.

When the system is in program mode, the user can enter characters of a sequence to be stored by pressing dial buttons (0–9, * or #), SPACE, FLASH or REDIAL. If fewer than 15 characters are displayed and the user presses a dial button or FLASH, the system presents a single beep and the character corresponding to that dial button or F for FLASH is displayed in the position that was occupied by the cursor and the cursor moves one position to the right.

If 15 characters are displayed (with the cursor in the 16th position) but fewer than 24 characters have been entered and the user presses a dial button or FLASH, the system presents a single beep, the first eight digits are moved up to Line 1, the next eight are shifted to the far left of line 2, and the cursor is in the 9th position on Line 2. If 24 characters have been entered, the cursor is removed. If 24 characters have been entered (and therefore 24 characters are displayed) and the user presses a dial button or FLASH, the system presents five rapid beeps, presents the character "Too many digits" in the bottom line of the display, flashes this display on and off 3 times, then exits program mode. This error feedback indicates that a sequence longer than 24 characters can not be stored in a memory location. If no characters are displayed (i.e., the cursor is in the leftmost position) and the user presses SPACE, nothing happens (i.e., no beep(s) and no change in the display). Therefore, "-," "P," or "W" character can not be the first character in a memory dialing sequence. If the user presses SPACE and at least one character, but fewer than 24 characters, have been entered and the rightmost character in the display is not "-" or "P," then the system responds as described in the first two bullets in the list, except that "-" is the character displayed.

If the user presses SPACE and the rightmost character in the display is "-," then the system presents a single beep and the rightmost character is changed from "-" to "P."

If the user presses SPACE and the rightmost character in the display is "P," then the system presents a single beep and the rightmost character is changed from "P" to "W."

If the user presses SPACE and the rightmost character is "W" and fewer than 24 characters have been entered, then the system responds as described in the first two bullets in this list, except that "-" is the character displayed.

If 24 characters have been entered and the rightmost character is not "-" or "P" and the user presses SPACE, the system presents five rapid beeps, flashes a display screen and off 3 times, then exits program mode.

If no characters are displayed (i.e., the cursor is in the leftmost position) and the user presses REDIAL, then the system presents a single beep, and the sequence stored in the redial location is displayed— If the sequence in redial has fewer than 17 characters, the entire sequence is displayed on the lower line and no cursor is displayed after the sequence.— If the sequence in the redial location has 17 to 24 characters, the last 16 characters are displayed on the lower line and the first 8 characters are displayed on Line 1 in the screen display.

If one or more characters are displayed and the user presses REDIAL, there is no effect (i.e., no beep(s) and no change in the display).

If the system is in program mode and the user presses a memory button, then the sequence of digits/characters displayed (even if it is a "null" sequence with no digits/ characters) is stored in the memory location corresponding to that button and any sequence previously stored in that location is deleted. When a memory button is pressed to store a sequence, the system presents a 2-beep confirmation signal, the display flashes on and off two times, then the system exits program mode. While the display flashes on and off:

If any digits/characters were displayed when the memory button was pressed, these digits/characters continue to be displayed, but the cursor is not displayed.

If no digits/characters were displayed when the memory button was pressed, then dashes are displayed in the first 15 positions and the 16th position is blank, When the system is in program mode, it remains in program mode until one of the following events happen:

The user presses PROGRAM. In this case, the system presents a single beep and returns to standby mode and the "standby mode" screen is displayed.

Sixty seconds elapse with no valid input. In this case, the system returns to standby mode and the "standby mode" screen is displayed.

If the system is on-hook and the user releases the switchhook or presses SPEAKER to go off-hook, the system exits the program mode and the "off-hook" screen is displayed.

The system can be set for automatic line selection or manual line selection. The default setting is for automatic line selection with Line 1 as the preferred line.

To view the current line selection option, the user presses PROGRAM to cause the system to enter the program mode, then presses the UP arrow in the repertory area (UP). The "line selection" screen is displayed.

Changing the Preferred Line When the "line selection" screen is displayed, the user may press # to change the preferred line. When the "line selection" screen is displayed, the user may press UP so that the Automatic Line Selection screen is displayed.

When the system is in program mode, it remains in program mode until one of the following events happen:

The user presses PROGRAM. In this case, the system presents a single beep and returns to standby mode and the "standby mode" screen is displayed.

Sixty seconds elapse with no valid input. In this case, the system returns to standby mode and the "standby mode" screen is displayed.

If the system is on-hook and the user releases the switchhook or presses SPEAKER to go off-hook, the system exits the program mode and the "off-hook" screen is displayed.

To store the local area code, which is used to adapt incoming number information for display and display dial feature, the user presses PROGRAM to cause the system to enter the program mode, then presses the [DOWN arrow] in the repertory area ([DOWN]). The "local area code" screen is displayed with the current area code setting. Enter area code 317=Area code. The default setting for the area code is blank. To enter an area code, the user presses the numeric dial buttons. If no numeric dial buttons have been pressed since the change area code screen was displayed and the user presses a numeric dial button, the system clears the current area code setting from the display and puts the digit corresponding to the button in the rightmost position of the area code field. If a numeric button has been pressed since the change area code screen was displayed and the user presses a numeric dial button, the system clears the leftmost position of the area code field, moves the digits in the other two positions one position to the left, and displays the digit corresponding to the button in the rightmost position in the field. When the change area code screen is displayed, it remains displayed until the system exits program mode.

If 3 digits are displayed in the area code field when the system exits program mode, these 3 digits are stored as the current area code setting.

If 3 digits are not displayed in the area code field when the system exits program mode, the previous area code setting is stored as the current area code setting.

There are two lights to indicate status for Line 1 and two lights to indicate status for Line 2. For each line, one of the lights is red and the other light is green. The red light is used to indicate line-in-use status:

idle=off in use=on steady on-hold=flashing at a rate of 300 msec on, 300 msec off The green light is used to indicate ringing line status:

not ringing=off ringing=flashing at a rate of 500 msec on, 500 msec off

"Idle" vs. "in use" status is determined by the voltage level detected for the line. If the level is above the threshold voltage, the line is considered to be idle. If the level is below the threshold voltage, the line is considered to be in use. The threshold voltage has a preset level, but will change based on actual voltages detected during a sample of on-hook/off-hook transitions. This "adaptive" threshold minimizes the likelihood that the status light will display "in use" when the line is not in use but has a relatively low on-hook voltage level. If the system is not connected to one of the lines, the voltage level detected for that line will be 0. Therefore, the system will consider that line to be in use. When ringing voltage is detected for a line, the indicator for that line continues to display ringing status until the system goes off-hook on that line, the system detects that the line is in use (i.e., another telephone has gone off-hook on that line), or 8 seconds elapse without detecting ringing voltage.

Audible alerts can be presented for calls on Line 1 and calls on Line 2. The alerts are modulated tones presented through the speaker with different frequencies used for the Line 1 and Line 2 alerts.

The alert for Line 1 comprises a 750 Hz tone and a 1000 Hz tone modulated at 25 Hz. The alert for Line 2 comprises a 1250 Hz tone and a 1500 Hz tone modulated at 25 Hz. If ringing voltage is detected on a line and the system is not off-hook on handset or speakerphone on the other line or generating an audible alert for the other line, the system generates an audible alert according to the RINGER setting each time a ringing burst is detected from the line. If ringing voltage is detected on a line and the system is off-hook on handset or speakerphone on the other line, the system generates an audible alert according to the RINGER setting only if it has been more than 8 seconds since the last time ringing voltage was detected. This provides an attenuated, "abbreviated" ringing signal (one burst only) when the user is on a call on one line when a call on the other line is received. If ringing voltage is detected on a line and the system is already generating an audible alert for the other line, then the system does not generate an audible alert for this line.

If the system is in standby mode and more than 10 seconds have elapsed since ringing voltage was last detected and ringing voltage is detected, the display goes blank and the system checks for incoming call identification information on the telephone line. After 2 seconds, the system displays the incoming call screen. If incoming call information was detected, then, if the system is in standby mode, the incoming call information is displayed and a Call Log entry is created. If the system is not in standby mode when incoming call info is detected (e.g., the device is being programmed), the info is stored in the Call Log and is displayed if the system enters standby mode within 10 seconds after the last ring. If no incoming call info is detected during a call, then "NO DATA SENT" is displayed in the name field of the incoming call screen and no Call Log entry is created. If the incoming call screen is displayed, it continues to be displayed until the system goes off-hook and then on-hook or, if the system remains on-hook, until 10 seconds elapse after ringing stops.

If incoming call information is received, then the time and date that the information was received is displayed in the time and date fields of the incoming call screen and the name/number information displayed in the incoming call screen as outlined below:

If name and number information is received, the name is presented in the name field and the number is presented in the number field, with the number of duplicates calls from this number since the list was last reviewed. Jones Jennifer 908-555-1212. If only number information is received, the number is presented in the number field and the name field has the time and date. If information received indicates that name/number information can not be delivered because it has not been received by the local central office, then "OUT OF AREA" is presented in the number field and the name field has the time and date.

If information received indicates that name/number information can not be delivered because the information is blocked, either because the caller has entered a special code before dialing or is calling from a blocked line, then "PRIVATE CALL" is presented in the number field and the name field has the time and date.

If the system detects that the name/number information received may have been corrupted (i.e., a checksum error occurs), "Call ID Error" is presented in the number field and the name field has the time and date.

If no incoming call information is received, the time and date that the call was received in the time and date fields of the incoming call screen and "NO DATA SENT" is presented in the number field and the name field has the time and date.

The user can select either Line 1 or Line 2 as the preferred line and can set the system for "automatic line selection" or "manual line selection."

If the system is set up so that automatic line selection is enabled, then the system follows "ringing line selection," "idle line selection," or "no line selection" as described in the sections below.

For line selection, "ringing" means that ringing voltage is detected on a line and the system is generating an audible alert for that line (i.e., the RINGER switch for that line is not OFF). If the system is on-hook and one line is ringing and no line is manually preselected and the user releases the switchhook or presses the SPEAKER button, the system is off-hook and connected to the line that was ringing.

If the system is on-hook and both lines are idle and no line is manually preselected and the user releases the switchhook or presses the SPEAKER button, the system is off-hook and connected to the preferred line. If the system is on-hook and one line is idle and the other is not idle and not ringing and no line is manually preselected, then if the user releases the switchhook or presses the SPEAKER button, the system is off-hook and connected to the line that was idle.

If the system is set up so that automatic line selection is disabled, then the preferred line is always selected when the system goes off-hook, regardless of the status of that line, unless the user manually selects the other line.

The user can manually select a line by pressing the LINE 1 or LINE 2 button. If the system is on-hook, with the switchhook down, and the user presses LINE 1 or LINE 2, the speakerphone is turned on and the system is off-hook and connected to the line corresponding to the button that was pressed. If the switchhook is released and the user presses LINE 1 or LINE 2, the handset transmit and receive are unmuted and the system is off-hook and connected to the line corresponding to the button that was pressed. If the system is off-hook on Line 1 and the user presses LINE 2 or if the system is off-hook on Line 2 and the user presses LINE 1, the system will disconnect from the line and will be off-hook and connected to the line corresponding to the button that was pressed (Auto Drop). If the system is off-hook on Line 1 and the user presses LINE 1 or if the system is off-hook on Line 2 and the user presses LINE 2, there is no effect of the button press.

The user can go off-hook to place or receive a call by releasing the switchhook (e.g., by lifting the handset from the cradle) or by pressing SPEAKER to turn on the speakerphone with one of the lines selected—automatically or manually—as described earlier herein or by pressing the LINE 1 or LINE 2 button to go off-hook on that line and turn on the speakerphone if the switchhook is not released. When the system goes off-hook on telephone when no incoming call information is displayed, an "off-hook" screen is displayed and the dial mode is set according to the setting of the DIAL MODE switch.

When the telephone device goes off-hook, the system displays the sequence in the redial location (a series of 7 dashes if the redial location is empty) until a dial button is pressed. (If the sequence is longer than 9 characters and less than 17, "Redial:" is not displayed, and the characters are displayed, left-justified, in the lower row. If there are more than 16 characters in Redial, the last 10 are displayed in the bottom row, left-justified, and the other digits are displayed in the top row, left-justified. The time and date are not shown. If a dial button is pressed, the display is cleared and the digit/character corresponding to the dial button is displayed.

If the telephone device goes off-hook when incoming call information is displayed, the incoming call information continues to be displayed and the dial mode is set according to the setting of the DIAL MODE switch. This information continues to be displayed until a dial button is pressed or the system goes on-hook on telephone. If a dial button is pressed, the display is cleared and the digit/character corresponding to the dial button is displayed. And if the telephone device goes on-hook, the standby screen is displayed.

If the switchhook is released and the speakerphone is off, auditory signals received from the telephone line can be heard through the handset receiver and auditory signals can be transmitted through the handset microphone. If the speakerphone is on, the LED next to the SPEAKER button is on and auditory signals received from the telephone line can be heard through the speaker and auditory signals can be transmitted through the built-in microphone.

If the system is off-hook on the handset and the user presses the SPEAKER button, then the system is off-hook on the speakerphone (still connected to the same line) and the handset is off. If the system is off-hook on the speakerphone and the user releases the switchhook (e.g., by lifting the handset if it is in the cradle), the system is off-hook on the handset (still connected to the same line) and the speakerphone is off. If the system is off-hook on the speakerphone and the handset is off as a result of switching from handset to speakerphone (and not as the result of placing a call on hold) and the user presses the SPEAKER button, then the system is off-hook on the handset (still connected to the same line) and the speakerphone is off.

Handset receive volume is controlled by the VOLUME UP and VOLUME DOWN buttons while the system is off-hook on the handset and connected to a line. There are eight possible handset volume settings (1–8).

If the handset volume setting is less than 8 and the user presses VOLUME UP, the system presents a single beep through the speaker and the handset volume setting is increased by 1.

If the handset volume setting is 8 and the user presses VOLUME UP, the system presents a triple beep through the speaker and the handset volume setting is not changed.

If the handset volume setting is greater than 1 and the user presses VOLUME DOWN, the system presents a single beep through the speaker and the handset volume setting is decreased by 1.

If the handset volume setting is 1 and the user presses VOLUME DOWN, the system presents a triple beep through the speaker and the handset volume setting is not changed. Pressing the VOLUME UP or VOLUME DOWN button to adjust the handset volume setting does not result in a change in the display. The handset volume setting is stored in memory and is not affected by presses of the VOLUME UP and VOLUME DOWN buttons when the system is not off-hook on the handset and connected to a line.

Speakerphone volume is controlled by the VOLUME UP and VOLUME DOWN buttons while the system is off-hook on the speakerphone. There are 8 possible speakerphone volume settings (1–8).

If the speakerphone volume setting is less than 8 and the user presses VOLUME UP, the system presents a single beep through the speaker and the speakerphone volume is increased by 1.

If the speakerphone volume setting is 8 and the user presses VOLUME UP, the system presents a triple beep through the speaker and the speakerphone volume setting is not changed.

If the speakerphone volume setting is greater than 1 and the user presses VOLUME DOWN, the system presents a single beep through the speaker and the speakerphone volume setting is decreased by 1.

If the speakerphone volume setting is 1 and the user presses VOLUME DOWN, the system presents a triple beep through the speaker and the speakerphone volume setting is not changed. Pressing the VOLUME UP or VOLUME DOWN button to adjust the speakerphone volume setting does not result in a change in the display. The most recent speakerphone volume setting is stored in memory and is not affected by presses of the VOLUME UP and VOLUME DOWN buttons when the system is not off-hook on the speakerphone.

If the system is off-hook on handset or speakerphone and connected to a telephone line, the user may press the dial buttons to generate dialing signals to the telephone line according to the programming of DIAL MODE. If the dial mode is pulse, then a single beep is presented each time a dial button is pressed (except for #, which has no effect) and dial pulses can be heard through the handset or speaker (whichever is active). If the dial mode is tone, no beeps are presented when dial buttons are pressed, but DTMF signals can be heard through the handset or speaker (whichever is active). If the dial mode is tone, then when the first dial button is pressed after the system goes off-hook, the display is cleared and the digit/character corresponding to the dial button is displayed in the first position the top line of the display. As subsequent dial buttons are pressed, the corresponding digit/character is appended to the sequence in the display. If a digit/character is displayed in all 16 positions then the 17th digit/character in the first position of the second line. As subsequent dial buttons are pressed, the corresponding digit/character is appended to the sequence in the display. If more than 32 digits are dialed, the top line is cleared and the lower line replaces it, with the 33rd character appearing on the 1st position of the lower line. If the dial mode is pulse, then pressing dial buttons has the same effect as described for the tone mode except that pressing # has no effect and pressing * both changes the dial mode from pulse to tone and displays the character for *. If the system is off-hook and at least one digit/character is displayed, and the SPACE button is pressed, the system presents a single beep through the speaker (but no signal is generated to the line) and:

- If the rightmost character in the display is not "-" or "P," then "-" is appended to the sequence in the display (as if a dial button has been pressed).
- If the rightmost character in the display is "-," then "P" replaces "-" in the display.
- If the rightmost character in the display is "P," then "W" replaces "P" in the display. If the system is off-hook and no digits/characters are displayed, pressing the SPACE button has no effect.
- If the telephone device is off-hook and the user presses REDIAL, then the system dials the sequence stored in the redial memory location and displays the sequence in the redial location as if it was being dialed manually.

A sequence is stored in the redial location, as described below, when the telephone device is off-hook on either line and the user manually dials a sequence, presses a memory button or presses the REDIAL button. There is only one redial location. The redial location can store a sequence of up to 24 digits/characters. Once a sequence with the maximum number of digits has been entered in the redial location, this location is full.

- If the dial mode is tone and the telephone device is off-hook and no dial button has been pressed since the telephone device went off-hook and the user presses a dial button, then the redial memory location is cleared and the digit corresponding to the dial button is entered in the first position in the redial location. If the telephone device is off-hook and at least one dial button has been pressed since the telephone device went off-hook and the redial location is not full and the user presses a dial button, then the digit corresponding to the dial button is appended to the sequence in the redial location. If the set is off-hook and at least one dial button has been pressed since the telephone device went off-hook and the redial location is full and the user presses a dial button, then this button has no effect on the redial location.
- If the dial mode is pulse, pressing dial buttons has the same effect as described for tone mode except that pressing # has no effect on the display or the redial location.
- If the telephone device is off-hook and the redial location is not full and the user presses the SPACE button to display a hyphen, "P" or "W", the corresponding character is stored in the redial location (but, if a hyphen is the last character displayed before the telephone device goes on-hook, the hyphen is deleted from the redial location when the set goes on-hook). If a "P" replaces a hyphen in the display, then the "P" also replaces the hyphen in the redial location. If a "W" replaces a "P" in the display, then the "W" also replaces the "P" in the redial location. For example, if the user presses dial buttons and the SPACE button to generate a display of "12-PH3," then "12-PH3" is in the redial location.
- If the telephone device is off-hook and the user presses REDIAL, then the digits/characters in the redial location are not changed.
- If the telephone device is off-hook and the user presses a memory button, then the digits/characters in the memory location corresponding to that memory button ("upper" or "lower," depending on whether or not the lower function was active when the button was pressed) are stored in the redial location as if they had been dialed manually. For example, if pressing a memory dial button results in dialing/displaying "1234," then "1234" is in the redial location. If the user presses dial buttons to dial/display "98" then presses a memory button to dial/display "1234" so that "981234" is displayed, then "981234" is in the redial location. If the memory location is blank, it has no effect on the redial location (i.e., it is the same as not pressing any dial buttons).

The redial location is cleared if the user presses PROGRAM to exit the program mode as the next valid action after pressing REDIAL to display the sequence in the redial location. This provides the user a quick way to clear the redial location from standby mode by pressing the sequence of PROGRAM→REDIAL→PROGRAM.

If the user presses the (AUTO) REDIAL button while the system is on-hook and in standby mode and at least one of the lines that would be selected automatically when the system goes off-hook is idle, the system enters auto redial mode and sets the number of tries to 1. While the system is in the auto redial mode, busy wait mode, or busy redial mode, the light next to the (AUTO) REDIAL button is on steady. When the system enters the auto redial mode, the (AUTO) REDIAL light is on, the system goes off-hook on speakerphone with transmit muted on the line automatically selected by the system (the sequence in the redial location is displayed), waits 3 seconds, then, if there is a sequence in the redial location, automatically dials the sequence in the redial location. (If there is no sequence in the redial location, the system displays 16 dashes in the display, then goes on-hook and is in standby mode.) The telephone device remains off-hook in auto redial mode until a busy signal is detected, the user lifts the handset, the user presses the SPEAKER button, the user presses the (AUTO) REDIAL button, the user presses the STOP button or 60 seconds elapse.

- If a busy signal is detected (via a "busy detect" algorithm), the system goes on-hook, enters the busy wait mode and sets the number of tries to 1.
- If the user lifts the handset, the system exits auto redial mode and is off-hook on the handset.
- If the user presses the SPEAKER button, the system exits auto redial mode and is off-hook on the speakerphone.
- If the user presses the LINE 1 or LINE 2 button, the system exits auto redial mode and is in standby mode or off-hook mode (if the line was on-hold).
- If the user presses the (AUTO) REDIAL button, the system exits auto redial mode and is in standby mode.
- If the user presses the STOP button, the system exits auto redial mode and is in standby mode.
- If 60 seconds elapse, the system exits auto redial and is in standby mode.

When the system enters the busy wait mode, the system initializes a wait timer, the (AUTO) REDIAL light remains on, a "busy wait" screen is displayed with a timer that counts down from 0:39 to 0:00, and the system remains in the busy wait mode until the (AUTO) REDIAL button is pressed, the STOP button is pressed, the user lifts the handset, the user presses SPEAKER, the user presses LINE 1 or LINE 2 or the wait timer reaches 40 seconds.

If the (AUTO) REDIAL button is pressed, the system exits busy wait mode and enters standby mode.

If the STOP button is pressed, the system exits busy wait mode and enters standby mode.

If the user lifts the handset or presses SPEAKER, the system exits busy wait mode and enters off-hook mode.

If the user presses LINE 1 or LINE 2, the system exits busy wait mode and enters standby mode or off-hook mode (if that line was on-hold).

If the wait timer reaches 40 seconds, the system increments the number of tries by 1 and, if the system is on-hook and in standby mode and the busy wait screen is displayed and a line that could be selected automatically is idle, the system exits busy wait mode and enters busy redial mode. If the system is not on-hook and in standby mode with the busy wait screen displayed and an idle line that could be selected automatically, then if the number of tries is less than 10, the system initializes the wait timer and remains in busy wait mode. If the number of tries is 10, than the system exits the busy wait mode and enters standby mode.

If the system does not remain on-hook and in standby mode while the auto redial feature is active, the number of times the system actually goes off-hook and redials the number may be less than 10. If the auto redial feature remains active, the system will always try to go off-hook and redial 10 times, but each time the system tries to do this when the system is not on-hook and in standby mode reduces by one the number of times the system actually goes off-hook and redials. While the system is in busy wait mode, the system responds to any inputs other than those specified above as if the system was in the standby mode. If the input changes the display from the "busy wait" screen, then the wait timer continues to run, but the system can not enter the busy redial mode. When the system returns to standby mode or the busy wait screen is otherwise redisplayed, then if the value of the wait timer is greater than 10 seconds, this value is displayed and the wait timer continues to run. If the value of the wait timer is less than 10 seconds, the system sets the wait timer to 10 seconds and the wait timer continues to run. (This latter action avoids cases in which the system might enter busy redial mode immediately after the system complete another action, such as reviewing an announcement.)

When the system enters busy redial mode, the system goes off-hook on the speakerphone with the transmitter muted (the sequence in the redial location is displayed), is connected to the selected line, and automatically dials the sequence in the redial memory location. The system remains in the busy redial mode until a busy signal is detected, the system goes off-hook on the handset, the user presses the SPEAKER button, the user presses the LINE 1 or LINE 2 button, the user presses the (AUTO) REDIAL button, the user presses the STOP button or 60 seconds elapse.

If a busy signal is detected and the number of tries is less than 10, the system goes on-hook and enters the busy wait mode. If the number of tries is 10, the system goes on-hook and enters standby mode.

If the system goes off-hook on the handset, the system exits busy redial mode and is off-hook on the handset.

If the user presses SPEAKER button, the system exits busy redial mode and is off-hook on the speakerphone and the transmitter is not muted.

If the user presses the LINE 1 or LINE 2 button, then the corresponding line is selected (and if that line is on-hold, that line is released from hold) and the system exits busy redial mode.

If the user presses the (AUTO) REDIAL button, the system exits busy redial mode, goes on-hook and is in standby mode.

If the user presses the STOP button, the system exits busy redial mode, goes on-hook and is in standby mode.

If 60 seconds elapse, the system exits busy redial mode, goes on-hook and is in standby mode.

This feature allows the user to view the last five telephone numbers called, including the number in Redial. Users then have the option of placing calls to the numbers in the stack through subsequent button press activity. All numbers called from the phone appear in the redial stack. The stack is maintained such that each position holds a unique telephone number and the numbers are always temporally correct. That is, there should not be repeated numbers in the stack or a repetition of the Redial number and a number dialed from the stack is moved to the latest position of the stack. A single button is used to provide access to this feature both on and off hook. It is desirable to allow users to selectively delete numbers from the redial stack.

The system can store up to five call entries in the Redial Stack. If the maximum number of entries is stored and the system creates a new entry, then the oldest entry in the log is deleted automatically to make room for the new entry.

Each entry includes:

the calling number (10 digits), if one was delivered the time and date of the call (based on the system clock).

The number of the line on which the call was received.

The position in the Redial list. Jones Jennifer 02 11:14AM 908-555-1212 ERR 02 11:14AM Line 2 The entry sequence number is displayed in the call field, in the format "n."

An entry is created automatically when the system detects calling information from the line. The calling information is placed in the entry along with the current time and date from the system clock, or if the clock has not been set, the time/date delivered from the central office is used. If the area code in the caller information matches the system area code and the calling number is not delivered in "dialable number" format, the area code is removed from the calling number in the entry. The entry sequence number is based on the other entries in the log: The entry is assigned the sequence number of m−b+1, where is m is the maximum number of entries and b is the number of blank entries, if b>0; if b=0, then the entry is assigned the sequence number of m. The message indicator is always off when the entry is created, but is turned on if the system stores a message during the call. If the Redial List is full when a new entry is created, the system deletes the entry with sequence number "01," decreases the sequence number for all other entries by 1, and assigns the sequence number "m" to the new entry. If a call is made from the Redial List, its position changes to m−b+1, and the previous instance of a call to that number is deleted. Duplicate calls are not stored.

To review the entries in the call log, the user presses the [DISPLAY] from an on-hook or off-hook state. The last number dialed is displayed. The user can then use [UP] or [DOWN] to traverse to more recent or earlier entries. When the system is not in the Redial list review state and the user presses [DISPLAY], then, if there is at least one entry, the Last Number Dialed (LND) screen is displayed. If there are no entries, then a "no calls" screen is presented. When the system is in the Redial List review state and the LND screen is displayed and the user presses the [DOWN] button, then the Redial List entry with the next-highest sequence number is displayed. When the system is in the Redial List review state and the LND screen is displayed and the user presses the [UP] button, then the Redial List entry with the lowest sequence number is displayed.

When the system is in the Redial List review state and an entry with a sequence number higher than "01" is displayed and the user presses the [DOWN] button, then the entry with the next lower sequence number is displayed. If the entry with sequence number "01" is displayed and the [DOWN] button is pressed, the "end of list" screen is displayed.

When the system is in the Redial List review state and an entry with a sequence number lower than the highest numbered entry in the current Redial List is displayed and the user presses the [UP] button, then the entry with the next higher sequence number is displayed. If the entry with the highest sequence number in the current Redial List is displayed and the [UP] button is pressed, the "end of list" screen is displayed. When the system is in the Redial List review state and the "end of list" screen is displayed and there is at least one entry in the Redial List and the user presses the [DOWN] button, then the entry with the highest sequence number is displayed.

When the system is in the Redial List review state and the "end of list" screen is displayed and there is at least one entry in the Redial List and the user presses the [UP] button, then the entry with sequence number "01" is displayed. After the system enters the Redial List review state, it remains in the Redial List review state until:

five seconds elapse with no valid input. In this case, the system enters standby mode.

The system goes on-hook. In this case, the system enters the standby mode.

The system provides a feature of selecting/deselecting an entry as a priority entry. This feature allows the user to designate certain calls as priority calls so that the system will generate an audible priority call signal during ringing when a call from this number is received. To change an entry from a non-priority entry to a priority entry, the user presses [*] while the entry is displayed. The system displays the PRIORITY annunciator in the display. To change an entry from a priority entry to a non-priority entry, the user presses [#] while the entry is displayed. The system removes the PRIORITY annunciator from the display. After the system exits call log review mode, all entries designated as priority entries are moved to the beginning of the call log and the time and date information is removed from the call log. A priority entry can not be deleted automatically or manually.

The system permits the user to delete a specific entry. This feature allows the user to remove specific entries in the Redial List, which prevents anyone from seeing the entry and makes more room for new entries. To delete a specific entry that is not a priority entry, the user follows the steps to review that entry and then presses the REMOVE button. The entry is deleted and the sequence number is decreased by 1 for any entries with a sequence number higher than the entry that was deleted. The system displays the "call removed" screen for two seconds, then:

If there was a higher numbered entry that now has the sequence number of the entry that was deleted, the system displays that entry.

If there was not a higher numbered entry that now has the sequence number of the entry that was deleted, the system displays the "end of list" screen.

If there are no other entries in the call log, the system displays the "no calls" screen.

The system permits deleting all entries. This feature allows a user to remove all of the non-priority entries in the call log with one action, which prevents anyone from seeing the entries and makes room for new entries. To delete all non-priority entries in the log, the user holds down the REMOVE button for 2 seconds while the system is in the call log review state. The system deletes these entries and displays the "no calls" screen.

The system permits automatically dialing a number in an entry. This feature allows the user to place a call quickly and easily. To automatically dial a number in an entry, the user follows the steps to review that entry and then either presses the [DIAL DISPLAY] button, which causes the system to go off-hook on speakerphone if the system is not already off-hook and there is a number and no ERROR annunciator in the entry, or goes off-hook on handset or speakerphone (the entry continues to be displayed) and presses the [DISPLAY DIAL] button.

If an entry is being displayed when the [DISPLAY DIAL] button is pressed, the telephone device will go off-hook on speakerphone if the system is not already off-hook, and dial the displayed number.

If the entry is being displayed when [REDIAL] is pressed and the telephone device is off-hook, then the system dials the number stored in the entry.

If the entry is being displayed when [REDIAL] is pressed and the telephone device is on-hook, then the Auto Redial feature is initiated.

The system permits transferring the telephone number in an entry to a memory dialing location. This feature allows the user to store a called number in a memory location so that it will be available for convenient dialing. To transfer a number from a Redial List entry to a memory dialing location, the user follows the procedure for reviewing that entry, then presses the PROGRAM button (the program mode screen is displayed with the number from the call log entry in the number field) followed by a memory button. (The feedback for storing this number should be similar to that provided when the user is storing a number in memory by manually dialing that number).

If the telephone device is off-hook and the user presses a memory dialing button then the telephone device dials and displays the sequence stored in the corresponding memory dial location.

Any digits (0–9) in the sequence are dialed and displayed as if they had been manually dialed.

If a "*" or "#" is in the sequence, the system responds as if the button corresponding to that symbol had been pressed, except that, if the dial mode is pulse, the # will be entered into redial memory (unless redial memory is full), even though it would not be if it were dialed manually.

If an "F" is in the sequence, the system responds as if the FLASH button had been pressed at that point in the sequence.

If a "-" is in the sequence, this character has no effect on dialing.

If a "P" is in the sequence, a 2-second pause occurs after the system dials the digit preceding the "P." The user should be able to hear signals from the telephone line through the handset or speakerphone, whichever is active, during a pause.

If a "W" is in the sequence, the system pauses after it dials the digit preceding the "W" and waits either for a memory button or REDIAL to be pressed or for 30 seconds to elapse before continuing to dial/display any digits/characters that follow the "H." If a memory button or REDIAL is pressed while the system is waiting, this button has no other effect except for causing the system to dial/display the digits/characters (if any) that follow the "H." The user should be able to hear signals from the telephone line through the handset or speakerphone, whichever is active, during a wait.

Whether the system is on-or off-hook, or in the standby mode or if a call is on hold at the system, then if the user presses the display key, the sequence stored in the corresponding memory location or Redial is displayed or, if no sequence is stored in the location, a sequence of 16 hyphens is displayed. The sequence remains displayed until 15 seconds elapse or until any other button is pressed or the telephone device goes off-hook.

If 15 seconds elapse, the standby screen is displayed.

If any other button is pressed, the screen corresponding to that button input is displayed or, if the button input does not result in a screen change, the standby screen is displayed.

If the telephone device goes off-hook, the off-hook screen is displayed.

If the telephone device is off-hook and the dial mode is dial pulse, then if the user presses *, the dial mode is changed to touch tone. The dial mode continues to be touch tone until the set disconnects from that line. The system allows the user to temporarily switch from PULSE to TONE during a call by pressing the * button. The dial mode reverts to the switch setting automatically when the call is ended. The * character can also be stored in a memory dialing location to cause a temporary switch from PULSE to TONE during dialing of the sequence in the memory location.

If the telephone device is off-hook and the handset is active on a line and the mute function is off and the user presses the MUTE button, the handset transmitter is turned off and the MUTE light is turned on. If the telephone device is off-hook and the speakerphone is on and the mute function is off and the user presses the MUTE button, the speakerphone transmitter is turned off and the MUTE light is turned on. If the telephone device is off-hook and the handset is active on a line and the mute function is on and the user presses the MUTE button, the handset transmitter is turned on and the MUTE light is turned off. If the telephone device is off-hook and the speakerphone is on and the mute function is on and the user presses the MUTE button, the handset transmitter is turned on and the MUTE light is turned off.

If the mute function is on (i.e., MUTE light on and either handset or speakerphone transmitter is off) and the SPEAKER button is pressed or the switchhook is pressed (either to go on-hook or switch from handset to speakerphone or vice versa) or the HOLD button is pressed, then the mute function is turned off (i.e., MUTE light off and either handset or speakerphone transmitter turned on if the telephone device is still off-hook). If the system is off-hook on handset or speakerphone on one line and the user presses the HOLD button, the call on that line is placed "on hold." The system is still connected to that line, but the user can not transmit or receive signals to or from that line. The red light for that line displays hold status. If the system is off-hook on handset or speakerphone on both lines (i.e., a conference call), the calls on both lines are placed "on hold." The system is still connected to the lines, but the user can not transmit or receive signals to or from that line. The red lights for both lines display hold status. If the system is off-hook on handset when a call is placed on hold, the handset is off. The user can depress the switchhook (e.g., to place the handset in the cradle) without disconnecting the call. If the telephone device is off-hook on the speakerphone when a call is placed on hold, the speakerphone is turned off automatically.

If a call on one of the lines has been placed on hold at the system (i.e., red light displays hold status), the user can take the call off hold in order to transmit and receive signals to and from that line by pressing the LINE button for that line.

If the switchhook is up, the system will be off-hook on the handset.

If the switchhook is down, the speakerphone will be turned on automatically so that the system will be off-hook on speakerphone. When the call is released from hold at the system, the red light for that line indicates in-use status and the display returns to what it was before the call was placed on hold. If a call is on hold at the system and the system detects that a different telephone has gone off-hook on that line, then the call is taken off hold and, if the switchhook is down, the telephone device is on-hook or, if the switchhook is up, the handset is off. In either case, the red light for that line displays in-use status and the standby mode screen is displayed.

If the telephone device is connected to one line or both lines, the user may press the FLASH button to generate a timed "switchhook flash." Pressing the FLASH button clears the display, but has no effect on the sequence stored in the redial buffer.

If the telephone device is off-hook on the handset on one line, the user can end the call by pressing the switchhook or pressing the button for the other line If the telephone device is off-hook on the speaker on one line and the switchhook is depressed, the user can end the call by pressing the SPEAKER button or pressing the button for the other line During a conference call, the system is off-hook on both lines so that the far-end parties on each line can transmit and receive to each other.

The user can initiate by pressing the CONFERENCE button when the system is connected to one line and the other line is on-hold at the system or when both lines are on-hold at the system. If the system is off-hook on handset or speakerphone on one line and the other line is not on-hold and the user presses the CONFERENCE button, the system places the first line on hold and then is off-hook on handset or speakerphone on the other line. The user can make, answer, or join a call on this second line, then press CONFERENCE to initiate a conference call.

If the system is connected to both lines and the user presses the HOLD button, then both lines are on-hold at the system. If the system is off-hook on the handset, the handset is disconnected from both lines. If the system is off-hook on the speakerphone, the speakerphone is turned off automatically.

If the system is off-hook on both lines and the user presses the LINE 1 or LINE 2 button, the system remains connected to the line corresponding to the button that is pressed and disconnects from the other line.

If the system is off-hook on the handset on both lines and the user presses the switchhook, the system disconnects from both lines and is on-hook. If the system is off-hook on the speaker on both lines and the handset is depressed and the user presses the SPEAKER button, the system disconnects from both lines and is on-hook.

The system provides an incoming call log. The call log allows the user to identify who has called his or her telephone number in the recent past (e.g., while the user was away from home). The user can then selectively respond based on this information (e.g., return a call, continue to wait for a call, check for messages on the answering system, etc.). In the same way that the user can not always identify a calling party as a call is being received, the user may not always be able to identify calling parties in the call log (e.g., entries that indicate "out of area" or "private call").

The system can store up to 15 call entries in the call log. If the maximum number of entries is stored and the system creates a new entry, then the oldest entry in the log that is not a priority entry is deleted automatically to make room for the new entry.

Each entry includes:

the calling name (up to 15 characters), if one was delivered—or "OUT OF AREA" or "PRIVATE"

the calling number (10 digits), if one was delivered the time and date the call was received (based on the system clock).

an entry sequence number]

a message/no message indicator]

an error/no error indicator

The number of the line on which the call was received.

The position in the ICLID list. The top line is used to display the calling name, or other information if a calling name was not delivered, or the number. The bottom line is used to display the time, data, entry sequence number, and Line number.

If both name and number were received, the name is presented on the top line and the entry sequence number and the time and date are presented in the lower line. Jones Jennifer 02 11:14AM 12/01 If the user presses [DISPLAY], and the number appears in the top line and the entry sequence number and the time and line number are presented in the lower line, 908-555-1212 ERR 02 11:14AM Line 2. If only number information is received, the number is presented on the top line and the entry sequence number and the time and date are presented in the lower line.

If the user presses [DISPLAY], and the number appears in the top line and the order information and the time and line number are presented in the lower line.

If information received indicates that name/number information can not be delivered because it has not been received by the local central office, then "OUT OF AREA" is presented on the top line and the entry sequence number and the time and date are presented in the lower line.

If information received indicates that name/number information can not be delivered because the information is blocked, either because the caller has entered a special code before dialing or is calling from a blocked line, then "PRIVATE CALL" is on the top line and the entry sequence number and the time and date are presented in the lower line.

If the system detects that the name/number information received may have been corrupted (i.e., a checksum error occurs), "Call ID Error" is presented on the top line and the entry sequence number and the time and date are presented in the lower line.

If no incoming call information is received, the time and date that the call was received in the time and date fields of the incoming call screen and "NO DATA SENT" is presented in the number field and the name field has the time and date.

If only number was received and the number matches a number in a memory dialing location, then the memory dialing location (e.g., MEMORY 2 UP) is presented in the name field and the number is displayed in the number field. The entry sequence number is displayed in the call field, in the format "nn.". The time setting (hh-mm-AM/PM) when the call was received is displayed in the time field. The date setting (mm/dd) when the call was received is displayed in the date field. If a message was recorded during the call and that message is still stored in memory and that message is still considered a new message, then the MESSAGE annunciator flashes on and off. If a message was recorded during the call and that message is still stored in memory and that message is not considered a new message, then the MESSAGE annunciator is on steady.] * If a checksum error was detected when the call information was received, the ERR appears on the same line, and after, the number. If the entry was created since the last time the system entered the call log review state, the NEW annunciator is on steady.

An entry is created automatically when the system detects calling information from the line. The calling information is placed in the entry along with the current time and date from the system clock, or if the clock has not been set, the time/date delivered from the central office is used. If the area code in the caller information matches the system area code and the calling number is not delivered in "dialable number" format, the area code is removed from the calling number in the entry. The entry sequence number is based on the other entries in the log: The entry is assigned the sequence number of m−b+1, where is m is the maximum number of entries and b is the number of blank entries, if b>0; if b=0, then the entry is assigned the sequence number of m. The message indicator is always off when the entry is created, but is turned on if the system stores a message during the call. If the calling number matches an entry that is already in the log, the old entry is replaced by the new entry, and the number of times that number has called, up to 9, is stored. If the Call Log is full when a new entry is created, the system deletes the entry with sequence number "01," decreases the sequence number for all other entries by 1, and assigns the sequence number "m" to the new entry. Each call results in separate entry. When an entry is created, it is considered a "new" (or "unreviewed") entry until the system enters, then exits the call log review state.

If there is at least one new entry in the call log, then the NEW CALL light is on steady. If there are no new entries in the call log, the NEW CALL light is off.

To review the entries in the call log, the user presses the [UP] or [DOWN] button while the system is in standby mode (on-hook or off-hook) and not in the call log review state:

When the system is not in the call log review state and the user presses the [DOWN] button, then, if there is at least one entry, the call log summary screen is displayed. If there are no entries, then a "no calls" screen is presented. When the system is not in the call log review state and the user presses the [UP] button, then if there is at least one entry in the call log, the call log summary screen is displayed. If there are no entries, then the "no calls" screen is presented. When the system is in the call log review state and the call log summary screen is displayed and the user presses the [DOWN] button, then the call log entry with the highest sequence number is displayed.

When the system is in the call log review state and the call log summary screen is displayed and the user presses the [UP] button, then the call log entry with the highest sequence number is displayed.

When the system is in the call log review state and an entry with a sequence number higher than "01" is displayed and the user presses the [DOWN] button, then the entry with the next lower sequence number is displayed. If the entry with sequence number "01" is displayed and the [DOWN] button is pressed, the "end of list" screen is displayed. When the system is in the call log review state and an entry with a sequence number lower than the highest numbered entry in the current log is displayed and the user presses the [UP] button, then the entry with the next higher sequence number is displayed. If the entry with the highest sequence number in the current call log is displayed and the [UP] button is pressed, the "end of list" screen is displayed.

When the system is in the call log review state and the "end of list" screen is displayed and there is at least one entry in the call log and the user presses the [DOWN] button, then the entry with the highest sequence number is displayed.

When the system is in the call log review state and the "end of list" screen is displayed and there is at least one entry in the call log and the user presses the [UP] button, then the entry with sequence number "01" is displayed. After the system enters the call log review state, it remains in the call log review state until:

5 seconds elapse with no valid input. In this case, the system enters standby mode.

The system goes on-hook. In this case, the system enters the standby mode.

The user presses the PLAY button while an entry that includes a message indicator is displayed. In this case, the system enters the selected message playback mode.

The user presses the PLAY button while the call log summary screen or the "end of list" screen is displayed. In this case, the system enters the message playback mode.

The user presses the STOP button. In this case the system enters the standby mode. When the system exits the call log review state, except when it exits to selected message playback mode, and at least one entry was displayed (i.e., the user pressed [UP] or [DOWN] while the call log summary screen was displayed), all "new" entries are reclassified as "old" (or "unreviewed") entries, even if the system did not display all of these "new" entries during the call log review state.

The system permits selecting/deselecting an entry as a priority entry. This feature allows the user to designate certain calls as priority calls so that the system will generate an audible priority call signal during ringing when a call from this number is received. To change an entry from a non-priority entry to a priority entry, the user presses [*] while the entry is displayed. The system displays the PRIORITY annunciator in the display. To change an entry from a priority entry to a non-priority entry, the user presses [#] while the entry is displayed. The system removes the PRIORITY annunciator from the display. After the system exits call log review mode, all entries designated as priority entries are moved to the beginning of the call log and the time and date information is removed from the call log. A priority entry can not be deleted automatically or manually.

The system permits deleting a specific entry. This feature allows the user to remove specific entries in the call log, which prevents anyone from seeing the entry and makes more room for new entries. To delete a specific entry that is not a priority entry, the user follows the steps to review that entry and then presses the REMOVE button. The entry is deleted and the sequence number is decreased by 1 for any entries with a sequence number higher than the entry that was deleted. The system displays the "call removed" screen for 2 seconds, then:

If there was a higher numbered entry that now has the sequence number of the entry that was deleted, the system displays that entry.

If there was not a higher numbered entry that now has the sequence number of the entry that was deleted, the system displays the "end of list" screen.

If there are no other entries in the call log, the system displays the "no calls" screen. To delete a specific entry that is a priority entry, the user must first change the entry to a non-priority entry.

The system permits deleting all entries. This feature allows the user to remove all of the non-priority entries in the call log with one action, which prevents anyone from seeing the entries and makes room for new entries. To delete all non-priority entries in the log, the user holds down the REMOVE button for 2 seconds while the system is in the call log review state. The system deletes these entries and displays the "no calls" screen.

The system permits automatically dialing a number in an Entry. This feature allows the user to return a call quickly and easily. To automatically dial a number in an entry, the user follows the steps to review that entry and then either presses the DIAL DISPLAY button, which causes the system to go off-hook on speakerphone if the system is not already off-hook and there is a number and no ERROR annunciator in the entry, or goes off-hook on handset or speakerphone (the entry continues to be displayed) and presses the DISPLAY DIAL button.

If the entry being displayed when the DISPLAY DIAL button is pressed includes a telephone number but not ERR and the area code is different than the system area code, the system automatically dials a "1" and then dials the number stored in the entry.

If the entry being displayed when the DISPLAY DIAL button is pressed includes a telephone number but not ERR and the area code is the same as the system area code, then the system dials only the 7-digit number stored in the entry.

If the entry being displayed when the DISPLAY DIAL button is pressed does not include a telephone number, then the system displays a "no number" screen for 5 seconds and then returns to the screen that was displayed before the button was pressed. If the entry being displayed when the DISPLAY DIAL button is pressed includes a telephone number but also includes the ERROR annunciator, then the system displays a "data error" screen for 5 seconds and then returns to the screen that was displayed before the button was pressed.

The user may press dial buttons first (e.g., 1+area code) and then press the DISPLAY DIAL button to dial the number in the entry. As soon as the first dial button is pressed, the system displays the "dialing" screen with the digit corresponding to the dial button.

If an entry being reviewed has a message indicator, the user can play the message that corresponds to the entry.

The system provides transferring the telephone number in an entry to a memory dialing location. This feature allows the user to store a calling number in a memory location so that it will be available for convenient dialing. To transfer a number from a call log entry to a memory dialing location, the user follows the procedure for reviewing that entry, then presses the PROGRAM button (the program mode screen is displayed with the number from the call log entry in the number field) followed by a memory button. (The feedback for storing this number should be similar to that provided when the user is storing a number in memory by manually dialing that number).

Since the computer is not always available and/or the application is not always running, the application uses the call log information in the telephone device to capture any calls and keep Caller ID information as explained earlier herein. If the personal computer is powered-on however, when the level of of information stored in the telephone device exceeds a predetermined level, by way of example, 50 percent of its memory capacity, the information from the telephone device is transferred to the computer, which has a much greater memory capacity.

Also if the personal computer is powered-on, any of the available telephony features available at the telephone device is also available at the computer. Also the telephony features accessible at the telephone device are made to appear when accessed on a video monitor associated with the computer. For example, pressing the DIRECTORY button at the telephone device causes the main directory page to appear on the computer. If the computer is not powered, however, pressing DIRECTORY has no effect.

If the computer delivers a RESET message and the processor is scrambled, the system begins the initialization routine and all information stored in memory (messages, announcements, clock setting, code settings, etc.) is lost. In addition:

If the speakerphone is on, the speakerphone is turned off and the telephone device is disconnected from the telephone line.

If a call is on-hold, the call is taken off hold and the telephone device is disconnected from the telephone line.

If the mute feature is on, the mute feature is turned off. If the computer delivers a RESET message and the processor is not scrambled, the button press has no effect. After the RESET button is pressed, the system always displays dashes when the system first goes off-hook, as if the redial location was empty, even if the redial location is not empty.

Referring to FIGS. 4 through 7, there is shown flow charts for the control functions performed by the circuitry and controls of FIGS. 1 through 3. The sequence in which these functions are performed is indicated in the flow charts, shown in sufficient detail to permit one skilled in the art to duplicate the circuitry of FIGS. 1 and 3, either by programming a microprocessor or by special purpose logic circuitry.

Although a specific embodiment of the invention has been shown and described, it will be understood that it is but illustrative and that various modifications may be made therein without departing from the scope and spirit of this invention as defined in the appended claims.

We claim:

1. An arrangement for interfacing a telephone device with a personal computer comprising:

means for attaching the telephone device to an analog line and to the personal computer;

sensing means for determining when said computer is in a powered-on state and in a powered-off state;

storage means in said telephone device for storing information received over said analog line and transmitted over said analog line while said computer is in the powered-off state;

means for transferring said information from said telephone device storage means to said computer while said computer is in the powered-on state;

storage means in the computer for storing said information transferred from said telephone device storage means to said computer while said computer is in the powered-on state; and means for retrieving information from said computer storage means and providing said retrieved information to said storage means in the telephone device, said retrieving means being responsive to user input provided either at the computer or at the telephone device.

2. The arrangement of claim 1 wherein said attaching means further includes means for attaching the telephone device to a plurality of analog lines.

3. The arrangement of claim 1 wherein said information includes decoded Caller ID information obtained from said analog line and a call log indicative of both outgoing accumulated calls transmitted over said analog line and incoming accumulated calls received over said analog line.

4. The arrangement of claim 1 wherein said information further includes voice, facsimile and electronic mail messages communicated between the telephone device and a remotely located telephone device via said analog line.

5. The arrangement of claim 1 further including means in said telephone device for providing telephone functionality at said telephone device.

6. The arrangement of claim 5 wherein said telephone functionality providing means includes directory means for storing user programmable telephone numbers, means for decoding Caller ID information received over the analog line, means for originating and receiving telephone calls and means for storing and retrieving data indicative of such telephone calls.

7. The arrangement of claim 6 wherein said telephone functionality providing means further includes means for providing a telephone answering device, means for providing integrated message viewing, and means for sending, receiving and viewing of facsimile messages.

8. The arrangement of claim 7 wherein said telephone functionality providing means still further includes means for receiving and transmitting electronic mail messages.

9. The arrangement of claim 5 further including means in said computer for providing telephone functionality at said computer identical to said telephone functionality provided in said telephone device.

10. The arrangement of claim 9 wherein said telephone functionality in said computer means is provided in a windows format on a display device associated with said computer.

11. The arrangement of claim 1 further including examining means responsive to said sensing means for determining a level of accumulated information stored in said telephone device, said transferring means transferring information from said telephone device to said storage means in the computer when the level of information stored in said telephone device exceeds a predetermined level.

12. The arrangement of claim 1 wherein said retrieving means is further responsive to user input received over said analog line from a terminal device at a remote location.

13. An analog system for interfacing a telephone device with a personal computer comprising:

means for attaching the telephone device to an analog line and to the personal computer;

sensing means for determining when said computer is in a powered-on state and in a powered-off state;

storage means in said telephone device for storing information received over said analog line and transmitted over said analog line while said computer is in the powered-off state;

means for transferring said information from said telephone device storage means to said computer while said computer is in the powered-on state;

storage means in the computer for storing said information transferred from said telephone device storage means to said computer while said computer is in the powered-on state; and means for retrieving information from said computer storage means and providing said retrieved information to said storage means in the telephone device, said retrieving means being responsive to user input provided either at the computer or at the telephone device.

14. A method of interfacing a telephone device with a personal computer comprising the steps of:

providing telephone functionality at said telephone device;

attaching the telephone device to an analog line and to the personal computer;

determining when said computer is in a powered-on state and in a powered-off state;

storing in said telephone both information received over said analog line and transmitted over said analog line while said computer is in the powered-off state;

responsive to said determining step, transferring information between said telephone device and said computer while said computer is in the powered-on state;

storing in memory in the computer said information transferred from said telephone device to said computer while said computer is in the powered-on state; and retrieving information from said memory in said computer and providing said retrieved information for storing the telephone device, said retrieving step being responsive to said determining step for retrieving said information from said memory in said computer, and said retrieving step also being responsive to user input provided either at the computer or at the telephone device.

15. The method of claim 14 wherein said attaching step further includes the step of attaching the telephone device to a plurality of analog lines.

16. The method of claim 14 wherein said information includes decoded Caller ID information obtained from said analog line and a call log indicative of both outgoing and incoming accumulated calls respectively transmitted and received over said analog line.

17. The method of claim 14 wherein said information further includes voice, facsimile and electronic mail messages.

18. The method of claim 14 wherein said telephone functionality providing step includes the steps of providing a directory for storing user programmable telephone numbers, decoding Caller ID information received over the analog line, originating and receiving telephone calls and storing and retrieving data indicative of such telephone calls.

19. The method of claim 18 wherein said telephone functionality providing step further includes the steps of providing a telephone answering device, providing integrated message viewing, and sending, receiving and viewing of facsimile messages.

20. The method of claim 19 wherein said telephone functionality providing step still further includes the step of receiving and transmitting electronic mail messages.

21. The method of claim 14 further including the step of providing providing telephone functionality in said computer identical to said telephone functionality provided in said telephone device.

22. The method of claim 21 wherein said telephone functionality providing step in said computer is provided in a windows format on a display device associated with said computer.

23. The method of claim 14 further including the step of examining a level of accumulated information stored in said telephone device, responsive to said determining step, for determining when the level of information stored in said telephone device exceeds a predetermined level, said transferring step transferring information from said telephone device to said memory in the computer when the level of information stored in said telephone device exceeds said predetermined level.

24. The method of claim 14 wherein said retrieving step is responsive to user input received over said analog line from a terminal device at a remote location.

25. An arrangement for interfacing a telephone device with a personal computer comprising:

means for attaching the telephone device to an analog line and to the personal computer;

sensing means for determining when said computer is in a powered-on state and in a powered-off state;

storage means in said telephone device for storing information received over said analog line and transmitted over said analog line while said computer is in the powered-off state, said information including voice, facsimile and electronic mail messages communicated between the telephone device and a remotely located telephone device via said analog line;

means for transferring said information from said telephone device storage means to said computer while said computer is in the powered-on state;

storage means in the computer for storing said information transferred from said telephone device to said computer while said computer is in the powered-on state; and means for retrieving information from said computer storage means while said computer is in the powered-on state and providing said retrieved information to said storage means in the telephone device, said retrieving means being responsive to user input provided either at the computer or at the telephone device.

* * * * *